United States Patent
Aymeric et al.

(10) Patent No.: US 10,761,326 B2
(45) Date of Patent: Sep. 1, 2020

(54) DUAL HARMONIZATION METHOD AND SYSTEM FOR A HEAD-WORN DISPLAY SYSTEM FOR MAKING THE DISPLAY OF PILOTING INFORMATION OF AN AIRCRAFT CONFORM WITH THE OUTSIDE REAL WORLD

(71) Applicant: THALES, Courbevoie (FR)

(72) Inventors: Bruno Aymeric, Saint Medard en Jalles (FR); Siegfried Rouzes, Mérignac (FR)

(73) Assignee: THALES, Courbevoie (FR)

( * ) Notice: Subject to any disclaimer, the term of this patent is extended or adjusted under 35 U.S.C. 154(b) by 50 days.

(21) Appl. No.: 16/213,921

(22) Filed: Dec. 7, 2018

(65) Prior Publication Data
US 2019/0196192 A1 Jun. 27, 2019

(30) Foreign Application Priority Data
Dec. 21, 2017 (FR) ...................................... 17 01342

(51) Int. Cl.
*G02B 27/01* (2006.01)
*G06F 3/01* (2006.01)
(Continued)

(52) U.S. Cl.
CPC ......... *G02B 27/017* (2013.01); *G01C 23/005* (2013.01); *G02B 27/0093* (2013.01);
(Continued)

(58) Field of Classification Search
CPC .. G02B 27/017; G02B 27/01; G02B 27/0093; G02B 2027/0187; G02B 2027/0198;
(Continued)

(56) References Cited

U.S. PATENT DOCUMENTS

| 5,138,555 A | * | 8/1992 | Albrecht | .............. | G02B 27/017 340/980 |
| 6,311,129 B1 | * | 10/2001 | Lin | .......................... | G09B 9/08 342/422 |

(Continued)

FOREIGN PATENT DOCUMENTS

WO 2015/165838 A1 11/2015

OTHER PUBLICATIONS

Tuceryan, et al., "Single point active alignment method (SPAAM) for optical see-through HMD calibration for AR", Proceedings of the IEEE and ACM International Symposium of Augmented Reality, pp. 149-158, Munich, Germany, Oct. 5, 2000.

*Primary Examiner* — Amy Onyekaba
(74) *Attorney, Agent, or Firm* — Baker & Hostetler LLP

(57) ABSTRACT

A dual harmonization method for a head-worn display system for making the display of piloting information of an aircraft conform with the outside real world includes a step of acquisition of N measurements $\hat{K}_i$ of head postures by a series of different sightings Vi, each of which aligns a sighting pattern, situated at a different fixed position Pi on the display D0 with a sighting vector that is a function of the position Pi, then a step of computation of the matrix of relative orientation M01 between the display D0 in a tilted position of engagement in the field of view and the tracking first element D1 as the right matrix $\hat{D}$ that is the solution of the dual harmonization system of equations $\hat{G} \cdot \hat{K}_i \cdot \hat{D} \cdot \vec{x}_i = \vec{y}_0$ for i varying from 1 to N, the vector $\vec{y}_0$ denoting the vector in the inertial reference frame of the platform corresponding to the target point targeted in the outside real world and being unknown; and the left matrix $\hat{G}$ being the matrix M23 of relative orientation between the fixed second element D2 and the attitude inertial device D3, which is potentially incorrect but assumed constant as a function of time, and (Continued)

which, when it is unknown, requires at least four measurements $\hat{K}_l$. A head-up display system is configured to implement the dual harmonization method.

14 Claims, 3 Drawing Sheets

(51) Int. Cl.
  *G02B 27/00* (2006.01)
  *G01C 23/00* (2006.01)
  *G05D 1/00* (2006.01)
  *G06K 9/00* (2006.01)

(52) U.S. Cl.
  CPC ............ *G02B 27/01* (2013.01); *G05D 1/0016* (2013.01); *G06F 3/011* (2013.01); *G06F 3/012* (2013.01); *G06K 9/00268* (2013.01); *G02B 2027/0187* (2013.01); *G02B 2027/0198* (2013.01)

(58) Field of Classification Search
  CPC ....... G06F 3/011; G06F 3/012; G01C 23/005; G05D 1/0016; G06K 9/00268
  See application file for complete search history.

(56) References Cited

U.S. PATENT DOCUMENTS

| | | | | |
|---|---|---|---|---|
| 6,377,401 | B1* | 4/2002 | Bartlett | F41G 3/225 345/8 |
| 6,449,559 | B2* | 9/2002 | Lin | G01C 21/165 342/357.31 |
| 7,046,215 | B1* | 5/2006 | Bartlett | G01S 5/163 345/8 |
| 7,409,290 | B2* | 8/2008 | Lin | G01C 21/165 342/357.27 |
| 8,019,538 | B2* | 9/2011 | Soehren | G01C 21/165 701/510 |
| 9,541,763 | B1* | 1/2017 | Heberlein | G01C 23/00 |
| 9,785,231 | B1* | 10/2017 | Zimmerman | G06F 11/1487 |
| 9,891,705 | B1* | 2/2018 | Lahr | G06F 3/012 |
| 10,216,265 | B1* | 2/2019 | Kirchner | G01C 21/165 |
| 2007/0030174 | A1* | 2/2007 | Randazzo | G01C 23/005 340/979 |
| 2009/0138138 | A1* | 5/2009 | Ferren | G05D 1/0676 701/3 |
| 2010/0156758 | A1* | 6/2010 | Anders | G01C 23/005 345/8 |
| 2011/0282130 | A1* | 11/2011 | Krueger | A61M 21/00 600/27 |
| 2012/0178054 | A1* | 7/2012 | Jomander | G09B 9/307 434/38 |
| 2014/0152792 | A1* | 6/2014 | Krueger | A61M 21/00 348/78 |
| 2015/0200449 | A1* | 7/2015 | Sleight | H01Q 1/28 342/352 |
| 2015/0317838 | A1* | 11/2015 | Foxlin | G02B 27/06 345/633 |
| 2016/0012643 | A1* | 1/2016 | Kezele | H04N 13/156 345/633 |
| 2017/0148340 | A1* | 5/2017 | Popa-Simil | G06F 30/20 |
| 2017/0276508 | A1* | 9/2017 | Hodge | G05D 1/0676 |
| 2017/0277199 | A1* | 9/2017 | Hodge | G01C 23/005 |
| 2017/0287342 | A1* | 10/2017 | Hodge | G01C 23/005 |
| 2017/0351325 | A1* | 12/2017 | Hashimoto | A63F 13/211 |
| 2018/0210627 | A1* | 7/2018 | Woo | G06F 3/013 |
| 2019/0041979 | A1* | 2/2019 | Kirchner | G01P 15/08 |
| 2019/0215505 | A1* | 7/2019 | Ishii | H04N 13/156 |

* cited by examiner

DUAL HARMONIZATION METHOD AND SYSTEM FOR A HEAD-WORN DISPLAY SYSTEM FOR MAKING THE DISPLAY OF PILOTING INFORMATION OF AN AIRCRAFT CONFORM WITH THE OUTSIDE REAL WORLD

CROSS-REFERENCE TO RELATED APPLICATIONS

This application claims priority to foreign French patent application No. FR 1701342, filed on Dec. 21, 2017, the disclosure of which is incorporated by reference in its entirety.

FIELD OF THE INVENTION

The present invention relates to a method for dual harmonization of a head-worn display system for making the display of piloting information of an aircraft conform with the outside real world.

The invention lies in the technical field of the piloting human-system interface (HSI) for aircraft, such as, for example, helicopters or aeroplanes, equipped with a head-worn or helmet-mounted display system (HWD or HMD) and a head posture detection device DDP.

BACKGROUND

The head-up display systems, whether worn or not, make it possible to display in particular a "symbology" conforming to the outside world, that is to say a set of symbols whose position in front of the eye of the pilot allows for a superimposition with the corresponding elements in the outside world. It may be for example a speed vector, a target on the ground or in the air, a synthetic representation of the terrain or even a sensor image.

This conformal display requires knowledge of the position and the attitude of the aircraft and, for the head-worn display devices, the attitude of the display relative to a fixed reference frame linked to the aircraft. These various positions and attitudes are supplied by the avionics systems for those of the aircraft, and by the posture detection device DDP for those of the display.

For example and in particular, the avionics systems for supplying the position and attitude of an aircraft can be, respectively:
  a global positioning device of GPS (global positioning system) type; and
  an inertial reference system IRS based on gyroscopes and accelerometers of MEMS (micro electro mechanical systems) type or laser gyroscope type, or an attitude and heading reference system AHRS.

As is known, a harmonization of the head-worn display system is performed on installation of the display system, in a cockpit, in order to compute the corrections of angles to be made to switch from the display reference frame to the aircraft reference frame, and in order to obtain a conformal head-up display.

Now, some head-worn display devices these days have a certain mobility between the display device or display and the worn part of the posture detection system DDP, because of an absence of mechanical rigidity between these two elements, i.e. the display and the mobile worn part of the DDP, for example when there is a device for tilting the display alone outside of the field of view of the operator. There is then a need, when the display is once again tilted into the field of view of the operator, to once again proceed with a harmonization in order to compute new corrections of angle to be made to the head once the head-up display is installed and thus be able to display a conformal symbology in the display device worn on the head.

In order to make it possible and to facilitate this relatively frequent need for reharmonization, it is known practice to install a dedicated instrument on board the aircraft, called boresight reference unit or boresight reticle unit BRU.

The boresight reference unit BRU, installed in the cockpit facing the head of the operator displays a collimated symbol with an orientation that is fixed and known to the head-up system.

Each time there is a need to realign the conformal symbology, i.e. for reharmonization, the operator aligns a symbol displayed in his or her head-up display with the collimated symbol of the boresight reference unit BRU.

When the symbol displayed in the head-up display, i.e. the display is aligned on the collimated symbol, the detection-device output harmonization system then computes a rotation matrix from three correction angles, in order to reharmonize the attitude of the reference frame of the display relative to the reference frame of the aircraft.

The main fault with this harmonization system based on the use of a boresight reference unit BRU is the inclusion of an additional item of equipment dedicated to just this realignment or harmonization function and a cost in terms of installation complexity, an additional bulk and weight that can be restrictive, in particular for small civilian aircraft. This BRU equipment item has to be powered through electrical wiring and installed in a robust manner. This BRU equipment item requires a lengthy harmonization procedure when it is installed with an additional error entry. A risk of misalignment through movement is possible for example upon installation or during a maintenance operation.

Furthermore, the exact parameters of orientation of this boresight reference unit BRU on the bearer, i.e. the bearing structure of the aircraft, has to be also introduced into the helmet-mounted display system HMD, and the BRU unit has to then always remain perfectly fixed relative to the bearer. Now, the current mechanical technologies do not make it possible to guarantee a mounting of the BRU unit in the cockpit without a risk of variations over time. Indeed, the vibratory environment, the interventions of the pilot and of the maintenance operators in particular can provoke slight rotations or movements of the boresight reference unit BRU, which results in the introduction of an error on the line of sight that cannot be compensated and, in many cases, that cannot be detected, and therefore the prevention of any subsequent reharmonization.

A first technical problem is how to provide a head-worn display system and a harmonization method which makes it possible to realign the symbology on the outside world when the head-up display or viewing system HWD/HMD has a mechanism for releasing and re-engaging the display in the field of view of the pilot, a source of misalignment, and to avoid the use of a calibration landmark installed inside the cockpit, also a source of error.

A second technical problem is how to more accurately determine the relative orientation M01 between the display D0 and the mobile tracking element D2 of the head posture detection subsystem DDP when the head-up display system HWD/HMD has a mechanism for releasing and re-engaging the display in the field of view of the pilot.

A third technical problem is how to correct the orientation of the aircraft supplied by its inertial station relative to the Earth, in particular for the heading whose value is generally not known with sufficient accuracy for a conformal display.

SUMMARY OF THE INVENTION

To this end, the subject of the invention is a dual harmonization method for a head-worn display system for making the display of piloting information of an aircraft conform with the outside real world, the head-worn display system comprising: a transparent head-worn display D0; a head posture detection subsystem DDP having a mobile tracking first element D1 securely attached to the transparent display D0, a fixed second element D2 securely linked to the platform of the aircraft, and a means for measuring and determining the relative orientation M12 of the mobile tracking first element D1 relative to a reference frame of the fixed second element D2 linked to the platform; an attitude inertial device D3 for supplying the relative attitude M3$t$ of the platform relative to a terrestrial reference frame linked to the Earth; a harmonization subsystem for the head-worn display system for making the display of piloting information on the display D0 conform with the outside real world, the harmonization subsystem having a dual harmonization computer and a human-system interface for managing and performing the implementation of the dual harmonization method.

The dual harmonization method is characterized in that it comprises the steps consisting in:
  performing a series of an integer number N greater than or equal to 3 of different sightings Vi, i varying from 1 to N, performed through the display D0 by aligning a centred sighting visual pattern on any same fixed target of the outside real world, each sighting Vi corresponding to a different fixed position Pi of the centre of the sighting pattern on the display D0 and having a sighting vector $\vec{xi}$ determined as a function of the position Pi, and, for each sighting Vi, acquiring the corresponding measurement $\hat{K}_i$ of the relative angular orientation of the tracking element relative to a DDP reference direction, that is fixed relative to the platform of the aircraft, then
  computing the matrix of relative orientation M01 between the display D0 in the tilted position and the tracking first element D1 as the right matrix $\hat{D}$, the solution of the system of equations: $\hat{G} \cdot \hat{K}_i \cdot \hat{D} \cdot \vec{x}_i = \vec{y}_0$ for i=1 to N, the vector $\vec{y}_0$ denoting the vector in the inertial reference frame of the platform corresponding to the target point targeted in the outside real world and being unknown, and the left matrix $\hat{G}$ being the matrix M23 of relative orientation between the reference frame of the fixed second element D2, linked to the platform of the aircraft, and the reference frame of the attitude inertial device D3, which is potentially incorrect but assumed constant as a function of time, and which, when it is unknown, requires at least four measurements $\hat{K}_i$.

According to particular embodiments, the dual harmonization method comprises one or more of the following features, taken alone or in combination:
  the number N of measurements is greater than or equal to three and the left matrix $\hat{G}$ of relative orientation between the reference frame of the fixed second element D2, linked to the platform of the aircraft, and the reference frame of the attitude inertial device D3 is known, and the solving of the system of equations $\hat{G} \cdot \hat{K}_i \cdot \hat{D} \cdot \vec{x}_i = \vec{y}_0$, i varying from 1 to N, uses an iterative process and a rectifying operator $\pi(\cdot)$ which transforms any matrix A into a 3×3 square matrix of rotation $\pi(A)$ that is as close as possible to the least squares directions over all of the terms of the matrix $\pi(A)-A$ over all of the 3×3 rotation matrices, to determine the matrix $\hat{D}$ and the vector $\vec{y}_0$;
  the step of solving of the system of equations comprises a first set of substeps consistings in: in a first, initialization substep, initializing a first series of right matrices $\{\hat{D}_{[s]}\}$, [s] denoting the integer rank of progress through the series $\hat{D}\{_{[s]}\}$, by setting $\hat{D}[0]$ equal to $I_3$, $I_3$ denoting the identity matrix; then repeating a second, iterative substep for passing from the iteration [s] to [s+1] by computing $\vec{y}_{[s+1]}$ then $\hat{D}_{[s+1]}$ using the following equations:

$$\vec{y}_{[s+1]} = \frac{\sum_{i \geq 1} (\hat{G} \cdot \hat{K}_i \cdot \hat{D}_{[s]} \cdot \vec{x}_i)}{\left\| \sum_{i \geq 1} (\hat{G} \cdot \hat{K}_i \cdot \hat{D}_{[s]} \cdot \vec{x}_i) \right\|}$$

$$\hat{D}_{[s+1]} = \pi\left( \sum_{i \geq 1} (\hat{K}_i^T \cdot \hat{G}^T \cdot \vec{y}_{[s+1]} \cdot \vec{x}_i^T) \right)$$

the series $\{\vec{y}_{[s]}\}$ denoting a second series of external direction vectors, the series $\{\vec{y}_{[s]}\}$ and $\{\hat{D}_{[s]}\}$ converging respectively towards $\vec{y}_0$ and $\overline{D}$; then, in a third, stopping substep, stopping the iterative process performed through the second substep when the limits 1 and C are approximated with a sufficient accuracy defined by one or two predetermined threshold values;
  the number N of measurements is equal to three, and the centred sighting visual pattern is set fixed on the display by the harmonization computer at three different positions P1, P2, P3 corresponding respectively to the three sightings V1, V2, V3: a first position P1 in the left part of the display and vertically to the centre, and a second position P2 in the right part of the display and vertically to the centre, and a third position P3 horizontally to the centre and upwards;
  the number N of measurements is greater than or equal to four and the left matrix $\hat{G}$ of relative orientation between the reference frame D2 linked to the platform of the aircraft and the reference frame linked to the inertial unit D3 is unknown, and not seeking to determine the vector $\vec{y}_0$, the solving of the system of equations: $\hat{G} \cdot \hat{K}_i \cdot \hat{D} \cdot \vec{x}_i = \vec{y}_0$, i varying from 1 to N, amounts to the solving of the system of equations: $\hat{K}_i \cdot \hat{D} \cdot \vec{x}_i = \vec{z}_0$ for i varying from 1 to 4, by denoting $\vec{z}_0 = \hat{G}_T \cdot \vec{y}_0$, which solving uses an iterative process and a rectifying operator $\pi(\cdot)$ which transforms any matrix A into a 3×3 square matrix of rotation $\pi(A)$ that is as close as possible to the least squares direction over all of the terms of the matrix $\pi(A)-A$ over all of the 3×3 rotation matrices, to determine the matrix D;
  the step of solving of the system of equations comprises a second set of substeps consisting in: in a fourth, initialization substep, initializing a first series of right matrices $\hat{D}\{_{[s]}\}$, [s] denoting the integer rank of progress through the series $\hat{D}\{_{[s]}\}$, by setting $\hat{D}_{[0]}$ equal to $I_3$, $I_3$ denoting the identity matrix; then repeating a fifth, iterative substep for passing from the iteration [s] to [s+1] by computing the value $\vec{z}_{[s+1]}$, then the value $\hat{D}_{[s+1]}$ of the first matrix series using the following equations:

$$\vec{z}_{[s+1]} = \frac{\sum_{i\geq 1}(\hat{K}_i \cdot \hat{D}_{[s]} \cdot \vec{x}_i)}{\left\|\sum_{i\geq 1}(\hat{K}_i \cdot \hat{D}_{[s]} \cdot \vec{x}_i)\right\|}$$

$$\hat{D}_{[s+1]} = \pi\left(\sum_{i\geq 1}(\hat{K}_i^T \cdot \vec{z}_{[s+1]} \cdot \vec{x}_i^T)\right)$$

the series $\{\vec{z}_{[s]}\}$ denoting an auxiliary second series of vectors and the series $\{\hat{D}_{[s]}\}$ converging towards $\hat{D}$; then, in a sixth, stopping substep, stopping the iterative process performed through the fifth substep when the limit $\hat{D}$ is approximated with a sufficient accuracy defined by a predetermined threshold value;

the number N of measurements is equal to four, and the centred sighting visual pattern is set fixed on the display by the harmonization computer at four different positions P1, P2, P3, P4 corresponding respectively to the four sightings V1, V2, V3, V4: a first position P1 in the left part of the display and vertically to the centre, and a second position P2 in the right part of the display and vertically to the centre, and a third position P3 horizontally to the centre and upwards, and a fourth position P4 horizontally to the centre and downwards;

the knowledge of the matrix M01 determined is used to realign the symbology by correcting the alignment error between the display and the tracking element of the posture detection subsystem DDP;

the visual pattern provided with a central point is a reticle of the symbology.

Another subject of the invention is a head-worn display system for making the display of piloting information of an aircraft on a display conform with the outside real world comprising: a transparent head-worn display D0; a head posture detection subsystem DDP having a mobile tracking first element D1 securely attached to the transparent display D0, a fixed second element D2 securely linked to the platform of the aircraft, and a means for measuring and determining the relative orientation M12 of the mobile tracking first element D1 relative to a reference frame of the fixed second element D2 linked to the platform; an attitude inertial device D3 for supplying the relative attitude M3t of the platform relative to a terrestrial reference frame linked to the Earth, securely fixed to the platform; a harmonization subsystem for the head-worn display system for making the display of piloting information on the display D0 conform with the outside real world, the harmonization subsystem having a dual harmonization computer and a human-system interface for managing and performing the implementation of the dual harmonization method.

The head-worn display system is characterized in that the harmonization subsystem is configured to: perform a series of an integer number N greater than or equal to 3 of different sightings Vi, i varying from 1 to N, performed through the display D0 by aligning a centred sighting visual pattern on any same fixed target of the outside real world, each sighting Vi corresponding to a different fixed position Pi of the centre of the sighting pattern on the display D0 and having a sighting vector $\vec{x}_i$ determined as a function of the position Pi, and, for each sighting Vi, acquiring the corresponding measurement $\hat{K}_i$ of the relative angular orientation of the tracking element relative to a DDP reference direction, that is fixed relative to the platform of the aircraft; then computing the matrix of relative orientation M01 between the display D0 in the tilted position and the tracking first element D1 as the right matrix $\hat{D}$, the solution of the system of equations:

$\hat{G}\cdot\hat{K}_i\cdot\hat{D}\cdot\vec{x}_i=\vec{y}_0$ for i=1 to N, the vector $\vec{y}_0$ denoting the vector in the inertial reference frame of the platform corresponding to the target point targeted in the outside real world and being unknown, and the left matrix $\hat{G}$ being the matrix M23 of relative orientation between the reference frame of the fixed second element D2, linked to the platform of the aircraft, and the reference frame of the attitude inertial device D3, which is potentially incorrect but assumed constant as a function of time, and which, when it is unknown, requires at least four measurements $\hat{K}_i$.

According to particular embodiments, the head-up display system comprises one or more of the following features, taken alone or in combination:

the number N of measurements is greater than or equal to three and the left matrix $\hat{G}$ of relative orientation between the reference frame D2 linked to the platform of the aircraft and the reference frame linked to the inertial unit D3 is known; and the solving of the system of equations $\hat{G}\cdot\hat{K}_i\cdot\hat{D}\cdot\vec{x}_i=\vec{y}_0$, i varying from 1 to N, uses an iterative process and a rectifying operator $\pi(\cdot)$ which transforms any matrix A into a 3×3 square matrix of rotation $\pi(A)$ that is as close as possible to the least squares direction over all of the terms of the matrix $\pi(A)-A$ over all of the 3×3 rotation matrices, to determine the matrix D and the vector $\vec{y}_0$;

the step of solving of the system of equations comprises a first set of substeps consisting in: in a first, initialization substep, initializing a first series of right matrices $\{\hat{D}_{[s]}\}$, [s] denoting the integer rank of progress through the series $\{\hat{D}_{[s]}\}$, by setting $\hat{D}_{[0]}$ equal to $I_3$, $I_3$ denoting the identity matrix; then repeating a second, iterative substep for passing from the iteration [s] to [s+1] by computing $\vec{y}_{[s+1]}$ then $\hat{D}_{[s+1]}$ using the following equations:

$$\vec{y}_{[s+1]} = \frac{\sum_{i\geq 1}(\hat{G}\cdot\hat{K}_i \cdot \hat{D}_{[s]} \cdot \vec{x}_i)}{\left\|\sum_{i\geq 1}(\hat{G}\cdot\hat{K}_i \cdot \hat{D}_{[s]} \cdot \vec{x}_i)\right\|}$$

$$\hat{D}_{[s+1]} = \pi\left(\sum_{i\geq 1}(\hat{K}_i^T \cdot \hat{G}^T \cdot \vec{y}_{[s+1]} \cdot \vec{x}_i^T)\right)$$

the series $\{\vec{y}_{[s]}\}$ denoting a second series of external direction vectors, the series $\{\vec{y}_{[s]}\}$ and $\{\hat{D}_{[s]}\}$ converging respectively towards $\vec{y}_0$ and $\hat{D}$; then, in a third, stopping substep, stopping the iterative process performed through the second substep when the limits $\hat{D}$ and $\hat{G}$ are approximated with a sufficient accuracy defined by one or two predetermined threshold values;

the number N of measurements is greater than or equal to four and the left matrix $\hat{G}$ of relative orientation between the reference frame D2 linked to the platform of the aircraft and the reference frame linked to the inertial unit D3 is unknown, and not seeking to determine the vector $\vec{y}_0$, the solving of the system of equations: $\hat{G}\cdot\hat{K}_i\cdot\hat{D}\cdot\vec{x}_i=\vec{y}_0$, i varying from 1 to N, amounts to the solving of the system of equations: $\hat{K}_i\cdot\hat{D}\cdot\vec{x}_i=\vec{z}_0$ for i varying from 1 to 4, by denoting $\vec{z}_0=\hat{G}^T\cdot\vec{y}_0$, which solving uses an iterative process and a rectifying operator $\pi(\cdot)$ which transforms any matrix A into a 3×3 matrix of rotation $\pi(A)$ that is as close as possible to the least squares direction over all of the terms of the matrix $\pi(A)$-A over all of the 3×3 rotation matrixes, to determine the matrix $\hat{D}$;

the step of solving of the system of equations comprises a second set of substeps consisting in: in a fourth, initialization substep, initializing a first series of right matrices $\{\hat{D}_{[s]}\}$, [s] denoting the integer rank of progress through the series $\{\hat{D}_{[s]}\}$, by setting $\hat{D}_{[0]}$, equal to $I_3$, $I_3$ denoting the identity matrix; then repeating a fifth, iterative substep for passing from the iteration [s] to [s+1] by computing the value $\vec{z}_{[s+1]}$, then the value $\hat{D}_{[s+1]}$ of the first matrix series using the following equations:

$$\vec{z}_{[s+1]} = \frac{\sum_{i\geq 1}(\hat{K}_i\cdot\hat{D}_{[s]}\cdot\vec{x}_i)}{\left\|\sum_{i\geq 1}(\hat{K}_i\cdot\hat{D}_{[s]}\cdot\vec{x}_i)\right\|}$$

$$\hat{D}_{[s+1]} = \pi\left(\sum_{i\geq 1}(\hat{K}_i^T\cdot\vec{z}_{[s+1]}\cdot\vec{x}_i^T)\right)$$

the series $\{\vec{z}_{[s]}\}$ denoting an auxiliary second series of vectors and the series $\{\hat{D}_{[s]}\}$ converging towards $\hat{D}$; then, in a sixth, stopping substep, stopping the iterative process performed through the fifth substep when the limit $\hat{D}$ is approximated with a sufficient accuracy defined by a predetermined threshold value.

BRIEF DESCRIPTION OF THE DRAWINGS

The invention will be better understood on reading the following description of several embodiments, given purely by way of example and by referring to the drawings in which.

DETAILED DESCRIPTION

Figure 1:
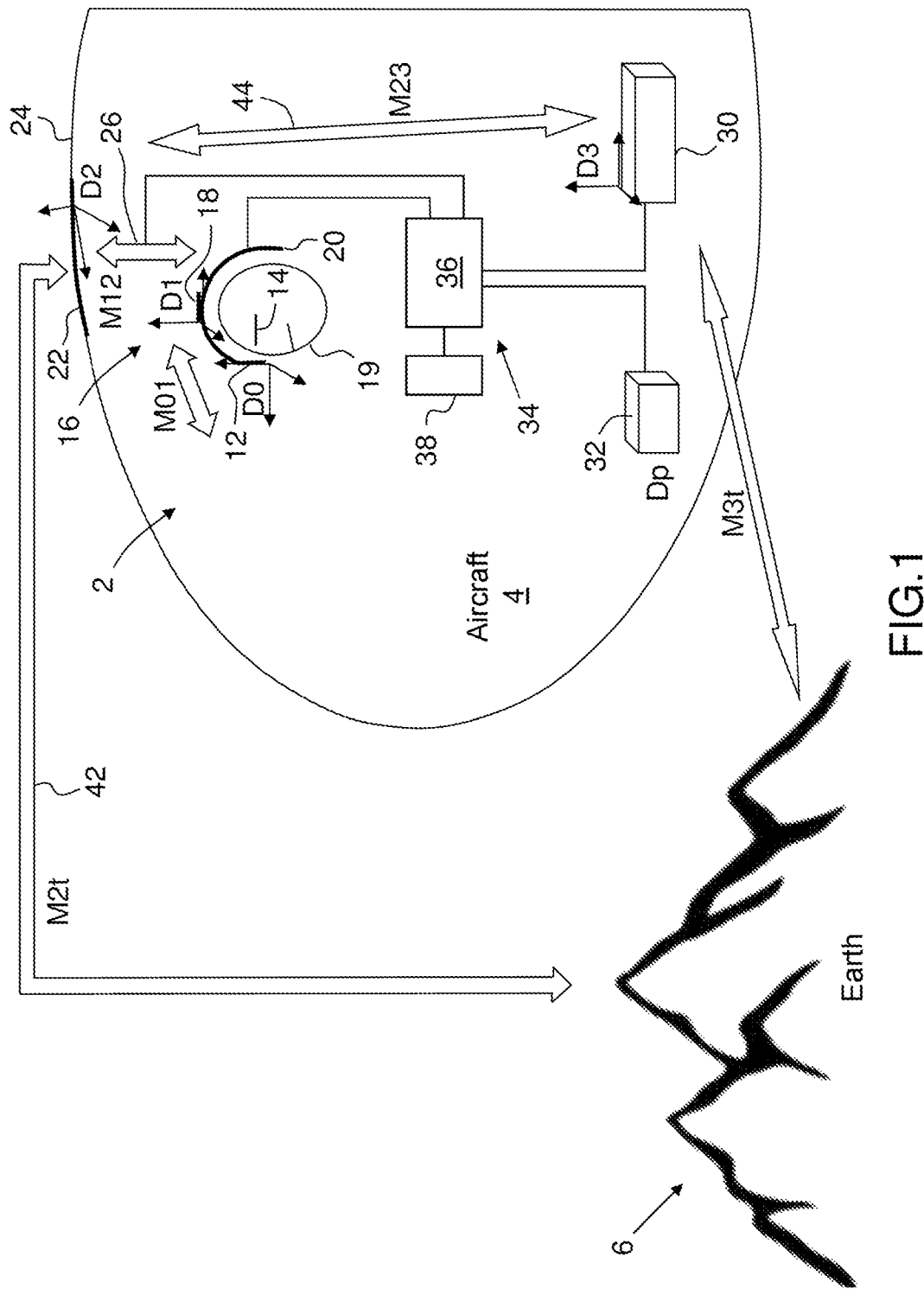
FIG. 1 is a view of a head-worn display system according to the invention for making the display of piloting information of an aircraft conform, which makes it possible to harmonize all the components of the head-up display system without having to use a bore site reference unit or a bore site reticle unit BRU, serving as calibration landmark inside the cockpit.

According to FIG. 1, a head-up display system 2 according to the invention for making the display of piloting information of an aircraft 4 on a display conform with the outside real world 6 comprises the following devices and means:

a transparent head-worn display device or display 12, denoted D0, positioned in front of the eye 14 of a pilot and being able to be used by him or her as viewfinder, for example a lens;

a posture detection subsystem 16 DDP, having a mobile tracking first element 18, denoted D1, rigidly attached to the head 19 or to the helmet 20 of the pilot and rigidly attached to the display D0 when the display D0 is placed in the field of view of the pilot, a fixed second element 22 D2, securely linked to the platform 24 (denoted also by "pl") of the aircraft 4 and serving as reference frame with respect to the posture detection subsystem 16 DDP, and a means 26 for measuring and determining the relative orientation M12 of the mobile tracking first element 18 D1 relative to a reference frame of the fixed second element 22 D2 linked to the platform, an attitude inertial device 30 D3, for example an AHRS inertial unit, for supplying the relative attitude M3t of the platform relative to a terrestrial reference frame "t" linked to the Earth, that is fixed to the platform, a device 32 Dp for supplying the position of the aircraft relative to the terrestrial reference frame linked to the Earth, for example a satellite positioning system of GPS type or a radio navigation system;

a dual harmonization subsystem 34 for the head-up display system 2 for making the display of piloting information on the display D0 conform with the outside real world, the harmonization subsystem 34 having a dual harmonization computer 36 and a human-system interface 38 for managing and performing the implementation of the dual harmonization method.

The dual harmonization computer 36 can be an electronic computer dedicated specifically to the implementation of the dual harmonization method or a more general-purpose electronic computer provided to also implement other functions of the head-up display system 2.

Likewise, the human-system interface 38 can be a human-system interface dedicated only to performing the harmonization method or a more general human-system interface sharing other functions of the head-up display system 2.

The display system also comprises a means 42 for defining, measuring or determining the relative angular orientation M2t of the fixed second element 22 D2 relative to the Earth, and a means 44 making it possible to know the relative orientation M23 of the fixed second element 22 D2, linked to the platform 24, relative to the attitude inertial device 30 D3.

The means 44 is implemented in the form of a procedure performed on installation of the head-worn display system 2 and the orientation M23 is assumed constant over time.

The means 42 uses the data of the attitude inertial device D3, attached to the platform of the aircraft and configured to measure its own orientation M3t relative to the Earth, and the angular orientation M23 supplied by the means 44.

The conformal piloting information comprises, for example, a speed vector, a target on the ground, a synthetic representation of the terrain or even an image from an electromagnetic sensor, for example an infrared sensor.

It is noteworthy that, in the current state of the art of head-up display systems, the posture detection subsystem 16 DDP is relatively complex in practice because it implements two measurements:

an inertial measurement of the relative angular orientation M2t of the fixed second element D2 relative to the Earth, and a direct measurement of the relative orientation of the mobile tracking first element D1 relative to the fixed second element D2, often in the form of image processing, and uses the knowledge of the relative orientation M2*t* of the fixed second element D2 relative to the Earth. However, while this particular feature makes the algorithms more complex, this particular feature has no impact on the head-up display system and the dual harmonization method of the present invention, and it will be possible to then consider that the relative orientation M12 of the tracking first element D1 relative to the fixed second element D2 is simply supplied by a direct measurement of the posture detection subsystem DDP.

Here, and according to a subsequently preferred embodiment, the posture detection subsystem 16 DDP is configured to supply raw DDP output data deriving as a priority from the direct optical measurements of the relative orientation between the tracking first element D1 relative to the fixed second element D2.

It is noteworthy also that, here, for simplification reasons, the platform and the attitude inertial device D3 are related. Generally, the means 44 for supplying the relative orientation M23 is configured to perform this function in two steps: a first step of transition by the platform in which the tri-axial reference frame of the attitude inertial device D3 is "aligned" on the tri-axial reference frame of the platform, then a second step in which the orientation of the fixed second element D2 is harmonized on the reference frame of the platform.

These comments have no impact here on the content of the present invention.

Subsequently, the means Mij making it possible to know the relative orientation of one reference frame "i" to another "j" are likened hereinbelow in this document to the matrix describing this orientation. Indeed, the orientation Mij of one reference frame relative to another can be described equally by:

three angles called Euler angles, which, conventionally in aeronautics, correspond to the order of the rotations for these following angles:

Bearing: rotation about the axis z which is oriented downwards (or towards the Earth);

Pitch: rotation about the axis y which is oriented to the right (or towards the east of the Earth);

Roll: rotation about the axis x which is oriented towards the front (or towards the north of the Earth), a 3×3 matrix describing this rotation.

Subsequently, the matrix Mij will be able to also be denoted M(i/j), the matrix Mij or M(i/j) describing the relative orientation of the reference frame "i" relative to "j" (or from "i" to "j"). If vi is the expression of a vector in the reference frame "i" and vj is the expression of this vector in the reference frame "j", then the relationship applies. Consequently, there is the relationship: vi=M(i/j)*vj and the relationship of transition between reference frames: M(i/k) (from i to k)=M(j/k)*M(ij).

The basic principle of the harmonization method for the head-up display system according to the invention rests on the use of a predetermined element of the outside terrestrial landscape used as landmark and a certain number of sightings consisting in aligning or superimposing a reticle of the symbology, fixed with respect to the display, on this outside element according to a number of positions of the reticle on the display which depends on the degrees of freedom affected by error of the relative angular orientation of the display D0 with respect to the mobile tracking first element D1 of the posture detection subsystem secured to the head.

Figure 2:
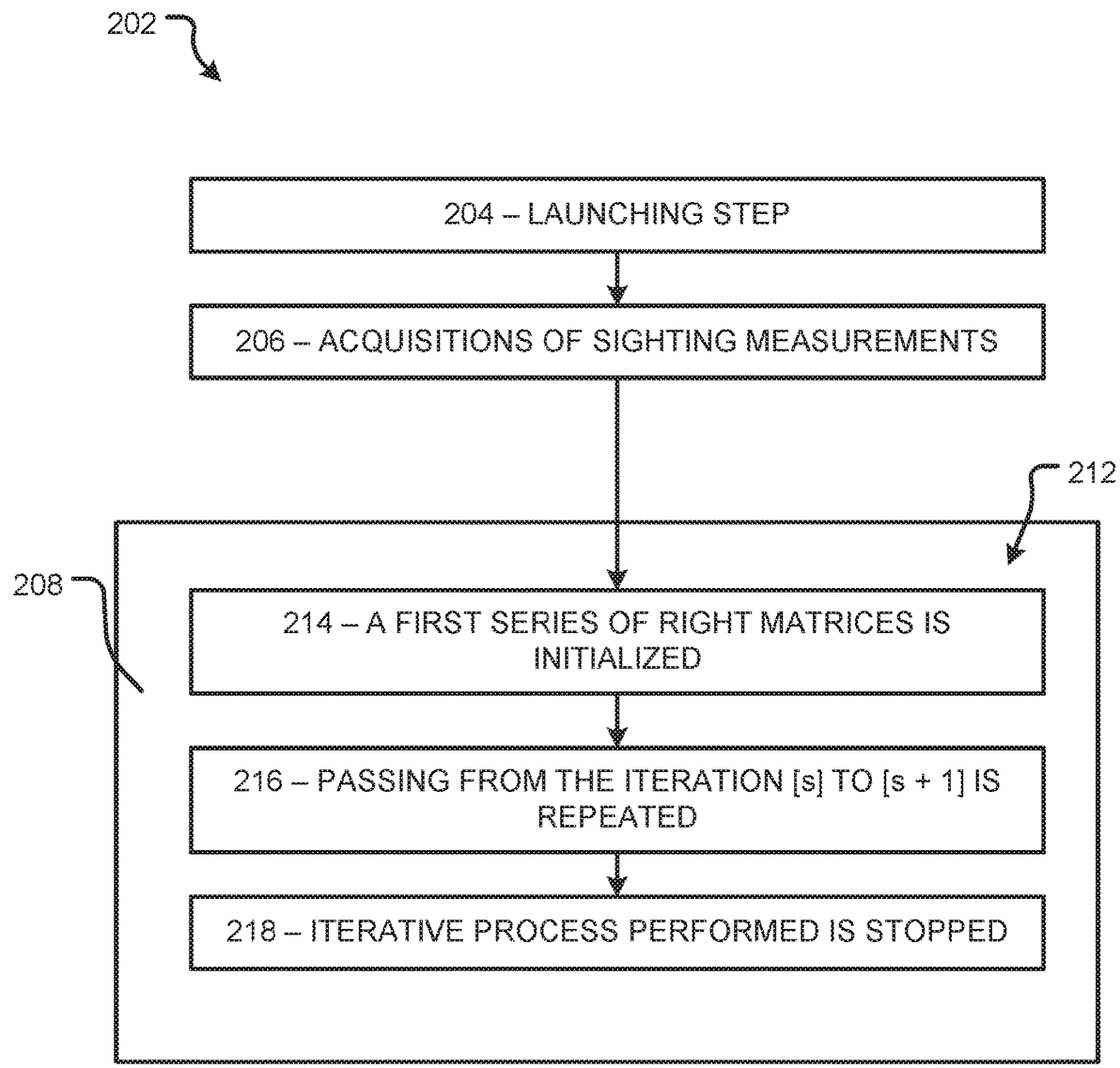
FIG. 2 is a flow diagram of a first embodiment of a harmonization method according to the invention for the head-worn display system of FIG. 1.

According to FIG. 2, a dual harmonization method 202 for the head-worn display system for making the display of piloting information of an aircraft on the display conform with the outside terrestrial world comprises a set of steps.

In a first, launching step 204, a triggering of the procedure for harmonizing the display of information conforming with the outside terrestrial world is actuated by the user of the head-worn display system, for example by pressing and holding a button situated in the cockpit and dedicated to this realignment. The display system is then set in a harmonization mode.

Then, in a second step 206 of acquisitions of sighting measurements, a centred sighting visual patter, for example a reticle of the symbology, is set fixed on the display by the computer at different positions, for example the following three different positions: (P1) left of the display and vertically to the centre, (P2) right of the display and vertically to the centre, then (P3) horizontally to the centre and upwards. In the same second step 206, the corresponding sightings, respectively denoted V1, V2, V3, are performed by aligning or superimposing the reticle, placed at the different positions P1, P2, P3 on the display, on a predetermined element of the real outside terrestrial landscape serving as landmark. These sightings V1, V2, V3 must be performed by taking the head roll: once to the right about the roll axis, that is to say the sighting axis, once to the left about the roll axis. For an optimal performance, each position of the reticle can give rise to two sightings: head inclined to the left then to the right, but this condition is not necessary to perform a harmonization of quality.

For each sighting Vi, i varying from 1 to 3, a corresponding measurement matrix Ki, i varying from 1 to 3, of relative orientation of the mobile part D1 of the posture detection subsystem DDP relative to the device D2 forming the fixed part of the subsystem is measured by the posture detection subsystem DDP and computed by the subsystem itself or the electronic harmonization computer which is connected to it.

Then, in a third step 208, the harmonization computer solves the following dual harmonization equation: $\hat{G} \cdot \hat{K}_i \cdot \hat{D} \cdot \vec{x}_i = \vec{y}_0$, in which:

the left correction matrix G is none other than the matrix M23, of transition from the device D2 (fiducial reference frame) to the inertial unit of the device D3;

the matrices Ki are matrices of measurements corresponding to the data from the posture detection subsystem DDP for each sighting V1, V2, V3 and the same matrices M12*i* corresponding to each sighting;

the right correction matrix D is the matrix M01 that is sought here that makes it possible to switch from the display D0 to the angular tracking element D1;

the vectors xi are the vectors corresponding to the position Pi of the sighting reticle for each sighting Vi, i varying from 1 to 3. If the reticle located at the position Pi is displayed with the bearing $xi°$ and pitch $yi°$, the vector xi expressed in the reference frame of the display is a column vector $[\cos(xi°)*\cos(yi°); \sin(xi°)*\cos(yi°); -\sin(yi°)]$;

the vector y0 is the vector in the reference frame of the inertial unit corresponding to the point targeted in the outside world serving as landmark. For example, a targeted point serving as landmark situated exactly in the axis of the inertial unit D3 will have the coordinates (1; 0; 0).

To solve the harmonization equation, the third step 208 uses the algorithms of the fifth and sixth embodiments described in the French patent application entitled "Global dual harmonization method and system for a posture detection system" and filed on the same date as the present French patent application, depending on whether the computation of the direction y0 is desired or not.

When the computation of the direction y0 is desired, the matrix G has to be known and the coordinates have to be expressed in the reference frame of G, the third step 208 uses the fifth embodiment of the dual harmonization algorithm described in the patent application entitled "Dual harmonization method for a posture detection subsystem incorporated in a head-worn display system" and implements a first set 212 of first, second, third computation substeps 214, 216, 218.

The fifth embodiment of the dual harmonization algorithm solves, through the first, second, third computation substeps 214, 216, 218, the system of equations: $\hat{G} \cdot \hat{K}_i \cdot \hat{D} \cdot \vec{x}_i = \vec{y}_0$ for i varying from 1 to 3.

In the first, initialization substep 214, a first series of right matrices $\{\hat{D}_{[s]}\}$ is initialized by setting $\hat{D}_{[0]}$ equal to $I_3$, $I_3$ denoting the identity matrix.

Then, the second, iterative substep 216 is repeated for passing from the iteration [s] to [s+1] by computing $\vec{y}_{[s+1]}$ then $\hat{D}_{[s+1]}$ using the following equations:

$$\vec{y}_{[s+1]} = \frac{\sum_{i \geq 1} (\hat{G} \cdot \hat{K}_i \cdot \hat{D}_{[s]} \cdot \vec{x}_i)}{\|\sum_{i \geq 1} (\hat{G} \cdot \hat{K}_i \cdot \hat{D}_{[s]} \cdot \vec{x}_i)\|}$$

$$\hat{D}_{[s+1]} = \pi\left(\sum_{i \geq 1} (\hat{K}_i^T \cdot \hat{G}^T \cdot \vec{y}_{[s+1]} \cdot \vec{x}_i^T)\right)$$

the series $\{\vec{y}_{[s]}\}$ denoting a second series of external direction vectors.

The series $\{\vec{y}_{[s]}\}$ and $\{\hat{D}_{[s]}\}$ converge respectively towards $\vec{y}_0$ and $\hat{D}$.

In the third, stopping substep 218, the iterative process performed through the second substep 216 is stopped when the limits $\hat{D}$ and $\hat{G}$ are approximated with a sufficient accuracy.

It is noteworthy that the fifth configuration mode of the dual harmonization computation demands, as usage constraints, that the minimum number of measurements N is greater than or equal to 3 and that the vector family $\{\vec{x}_i\}$ is free. That means that, as a variant of the harmonization method of the dual harmonization method for the display described in FIG. 2 in which the number of measurements is equal to 3, the dual harmonization method according to the first embodiment can also acquire a number strictly greater than 3 of measurements Ki, that is to say of sightings Vi, provided that the vector family $\{\vec{x}_i\}$ is free, and process the measurements Ki by using the sixth embodiment of the dual harmonization algorithm.

Figure 3:
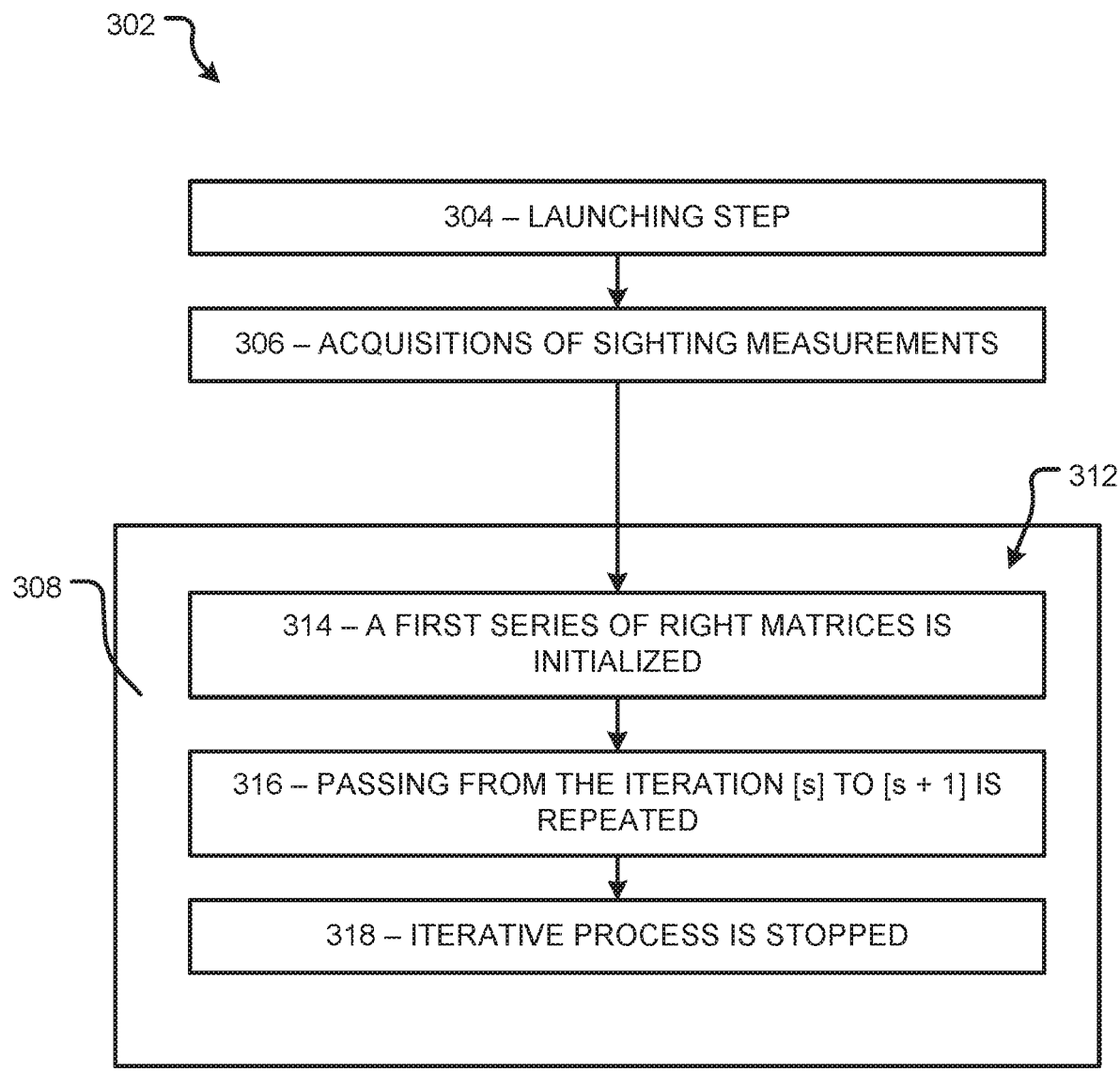
FIG. 3 is a flow diagram of a second embodiment of a harmonization method according to the invention for the head-worn display system of FIG. 1.

According to FIG. 3 and a second embodiment, a method 302 for harmonizing the display of piloting information on the display conforming with the outside terrestrial world comprises a second set 303 of fourth, fifth, sixth steps 304, 306, 308.

In the fourth, launching step 304, identical to the first step 204, a triggering of the procedure 302 for harmonizing the display of information conforming with the outside terrestrial world is actuated by the user of the head-worn display system, for example by maintained pressure on a button situated in the cockpit and dedicated to this realignment. The display system is then set in a harmonization mode.

Then, in the fifth step 306 of acquisitions of sighting measurements, a reticle of the symbology is set fixed on the display by the harmonization computer at four different positions, for example the following four different positions: (P1) left of the display and vertically to the centre, (P2) right of the display and vertically to the centre, (P3) horizontally to the centre and upwards, then (P4) horizontally to the centre and downwards. In the same fifth step 206, the corresponding sightings, respectively denoted V1, V2, V3, V4, are performed by aligning or superimposing the reticle, set at the different positions P1, P2, P3, P4 on the display, on a predetermined element of the outside real terrestrial landscape serving as landmark. These sightings V1, V2, V3, V4 have to be performed by taking the head roll: once to the right about the roll axis, that is to say the sighting axis, once to the left about the roll axis. For optimal performance, each position of the reticle can give rise to two sightings: head tilted to the left then to the right, but this condition is not necessary to perform a harmonization of quality.

For each sighting Vi, i varying from 1 to 3, a matrix of corresponding measurement Ki, i varying from 1 to 4, of relative orientation of the mobile part D1 of the posture detection subsystem DDP relative to the device D2 forming the fixed part of the subsystem is measured by the posture detection subsystem DDP and computed by the subsystem itself or the electronic harmonization computer which is connected to it.

Then, in the sixth step 308, the harmonization computer solves the following dual harmonization system of equations: $\hat{G} \cdot \hat{K}_i \cdot \hat{D} \cdot \vec{x}_i = \vec{y}_0$, in which:

the left correction matrix G is none other than the matrix M23, of transition from the device D2 (fiducial reference frame) to the inertial unit of the device D3;

the matrices Ki are the matrices of measurements corresponding to the data from the posture detection subsystem DDP for each sighting V1, V2, V3, V4 and the same matrices M12i corresponding to each sighting;

the right correction matrix D is the matrix M01 that is sought here that makes it possible to switch from the display D0 to the angular tracking element D1;

the vectors xi are the vectors corresponding to the position Pi of the sighting reticle for each sighting Vi, i varying from 1 to 4. If the reticle located at the position Pi is displayed with the bearing xi° and pitch yi°, the vector xi expressed in the reference frame of the display is a column vector [cos(xi°)*cos(yi°); sin(xi°)*cos(yi°); −sin(yi°)];

the vector y0 is the vector in the reference frame of the inertial unit corresponding to the point targeted in the outside world serving as landmark. For example, a targeted point serving as landmark situated exactly in the axis of the inertial unit D3 will have the coordinates (1; 0; 0).

Here, the dual harmonization system of equations to be solved differs from that of the second embodiment of the harmonization method in that:

the number of sightings Vi is equal to 4, the family of the vectors $\{\vec{x}_i\}$ being free, the matrix G is not known and any matrix G can be taken; and there is no attempt to compute the direction of the landmark y0.

In this case, to solve the harmonization equation, the sixth step 308 uses the algorithm of the sixth configuration described in the French patent application entitled "Global dual harmonization method and system for a posture detection system" and filed on the same date as the present French patent application, and implements one of the second set 312 of fourth, fifth, sixth computation substeps 314, 316, 318.

The dual solving harmonization algorithm of the sixth configuration amounts to the solving of the system of equations: $\hat{G} \cdot \hat{K}_i \cdot \hat{D} \cdot \vec{x}_i = \vec{y}_0$ for i varying from 1 to 4, to the solving of the system of equations: $\hat{K}_i \cdot \hat{D} \cdot \vec{x}_i = \vec{z}_0$ for i varying from 1 to 4, by denoting $\vec{z}_0 = \hat{G}^T \cdot \vec{y}_0$.

In the fourth substep 314, a first series of right matrices $\{\hat{D}_{[s]}\}$ is initialized by setting $\hat{D}_{[0]}$ equal to $I_3$, $I_3$ denoting the identity matrix.

Then, the fifth, iterative substep 316 for passing from the iteration [s] to [s+1] is repeated by computing $\vec{z}_{[s+1]}$ then $\hat{D}_{[s+1]}$ using the following equations:

$$\vec{z}_{[s+1]} = \frac{\sum_{i \geq 1} (\hat{K}_i \cdot \hat{D}_{[s]} \cdot \vec{x}_i)}{\left\| \sum_{i \geq 1} (\hat{K}_i \cdot \hat{D}_{[s]} \cdot \vec{x}_i) \right\|}$$

$$\hat{D}_{[s+1]} = \pi \left( \sum_{i \geq 1} (\hat{K}_i^T \cdot \vec{z}_{[s+1]} \cdot \vec{x}_i^T) \right)$$

the series $\{\vec{z}_{[s]}\}$ denoting a second series of external direction vectors.

The series $\{\hat{D}_{[s]}\}$ converges towards $\hat{D}$.

In the sixth, stopping substep 318, the iterative process performed through the fifth substep 316 is stopped when the limit $\hat{D}$ is approximated with a sufficient accuracy.

It is noteworthy that the dual harmonization algorithm of the sixth configuration demands, as usage constraints, that the minimum number of measurements N is greater than or equal to 4 and that the vector family $\{\vec{x}_i\}$ is free. That means that, as a variant of the dual harmonization method 302 for the display described in FIG. 3 in which the number of measurements is equal to 4, a dual harmonization method according to the invention can also acquire a number strictly greater than 4 of measurements Ki, that is to say of sightings Vi, provided that the vector family $\{\vec{x}_i\}$ is free, and process the measurements Ki by using the sixth embodiment of the dual harmonization algorithm.

Thus, the knowledge of the orientation of a BRU unit relative to the bearer has been replaced by the assumption of identity of the fiducial direction with different sightings. Thus, the rotation matrix M03 of orientation of the display relative to the fiducial reference frame D2, if it is unknown in the absolute, is identical in the different sightings. By using:
    the measurement of the matrix M12 of the relative orientation of the mobile tracking element D1 relative to the fixed element D2 of the posture detection subsystem DDP, and
    the knowledge of the matrix M23, i.e. the left matrix G, potentially incorrect but assumed constant,
    it is possible to determine the matrix M01 of relative orientation of the display D0 with respect to the mobile tracking element of the posture detection subsystem DDP such that, for each measurement: M12*M01*sighting vector=constant vector. Here, the sighting vectors are the vectors forming the family $\{\vec{x}_i\}$.

Advantageously, in addition to the saving of a calibration instrument such as the BRU and above all the complex installation thereof, the dual harmonization method according to the invention makes it possible to obtain a better alignment accuracy than that provided through the use of a BRU, particularly on the harmonization in terms of roll.

The dual harmonization method described above also makes it possible to dispense with the errors and drifts of relative orientation between a BRU and the inertial device D3.

The invention claimed is:

1. A dual harmonization method for a head-worn display system for causing a display of piloting information of an aircraft to conform with an outside real world, the head-worn display system comprising: a transparent head-worn display, a head posture detection subsystem having a mobile tracking first element securely attached to the transparent head-worn display, a fixed second element securely linked to a platform of the aircraft, and a means for measuring and determining a relative orientation M12 of the mobile tracking first element relative to a reference frame of the fixed second element linked to the platform of the aircraft, an attitude inertial device for supplying a relative attitude M3t of the platform of the aircraft relative to a terrestrial reference frame linked to Earth, a harmonization subsystem for the head-worn display system for causing the display of the piloting information of the aircraft on the transparent head-worn display to conform with the outside real world, the harmonization subsystem having a dual harmonization computer and a human-system interface for managing and performing the dual harmonization method, the dual harmonization method comprising: performing a series of an integer number N of different sightings Vi, wherein N is greater than or equal to 3, and i varying from 1 to N, performed through the transparent head-worn display by aligning a centred sighting visual pattern on any same fixed target of the outside real world, each sighting Vi corresponding to a different fixed position Pi of the centre of the sighting visual pattern on the transparent head-worn display and having a sighting vector $\vec{x}_i$ determined as a function of the position Pi, and for each sighting Vi, acquiring a corresponding measurement $\hat{K}_i$ of a relative angular orientation of the mobile tracking first element relative to a reference direction, that is fixed relative to the platform of the aircraft, then: computing a matrix of relative orientation M01 between the transparent head-worn display in a tilted position and the mobile tracking first element as a right matrix $\hat{D}$, a solution of a system of equations: solution of a system of equations: $\hat{G} \cdot \hat{K}_i \cdot \hat{D} \cdot \vec{x}_i = \vec{y}_0$ for i=1 to N, A vector $\vec{y}_0$ denoting a vector in an inertial reference frame of the platform of the aircraft corresponding to a target point targeted in the outside real world and being unknown; and a left matrix $\hat{G}$ being a matrix M23 of a relative orientation between the reference frame of the fixed second element, linked to the platform of the aircraft and a reference frame of the attitude inertial device, which is potentially incorrect but assumed constant as a function of time, and which, when it is unknown, requires at least four measurements $\hat{K}_i$.

2. The dual harmonization method for a head-worn display system for causing the display of piloting information of an aircraft to conform with the outside real world according to claim 1, in which:
    the series of integer number N is greater than or equal to three and the left matrix $\hat{G}$ of relative orientation between the reference frame of the fixed second element, linked to the platform of the aircraft, and the reference frame of the attitude inertial device is known, and solving of the system of equations $\hat{G} \cdot \hat{K}_i \cdot \hat{D} \cdot \vec{x}_i = \vec{y}_0$, i varying from 1 to N, uses an iterative process and a rectifying operator $\pi(\cdot)$ which transforms any matrix A into a 3×3 square matrix of rotation $\pi(A)$ that is as close as possible to a least squares direction over all of the terms of the matrix $\pi(A)-A$ over all of the 3×3 rotation matrices, to determine the matrix $\hat{D}$ and the vector $\vec{y}_0$.

3. The dual harmonization method for a head-worn display system for causing the display of piloting information of an aircraft to conform with the outside real world according to claim 2, in which:

the step of solving of the system of equations comprises a first set of substeps comprising:

in a first, initialization substep, initializing a first series of right matrices $\{\hat{D}_{[s]}\}$, [s] denoting an integer rank of progress through the series $\{\hat{D}_{[s]}\}$, by setting $\hat{D}_{[0]}$ equal to $I_3$, $I_3$ denoting an identity matrix; then:

repeating a second, iterative substep for passing from the iteration [s] to [s+1] by computing $\vec{y}_{[s+1]}$ then $\hat{D}_{[s+1]}$ using the following equations:

$$\vec{y}_{[s+1]} = \frac{\sum_{i \geq 1} (\hat{G} \cdot \hat{K}_i \cdot \hat{D}_{[s]} \cdot \vec{x}_i)}{\left\| \sum_{i \geq 1} (\hat{G} \cdot \hat{K}_i \cdot \hat{D}_{[s]} \cdot \vec{x}_i) \right\|}$$

$$\hat{D}_{[s+1]} = \pi \left( \sum_{i \geq 1} (\hat{K}_i^T \cdot \hat{G}^T \cdot \vec{y}_{[s+1]} \cdot \vec{x}_i^T) \right)$$

the series $\vec{y}_{[s]}$ denoting a second series of external direction vectors, and the series $\vec{y}_{[s+1]}$ and $\{\hat{D}_{[s]}\}$ converging respectively towards $\vec{y}_0$ and $\hat{D}$; then:

in a third, stopping substep, stopping the iterative process performed through the second substep when the limits $\hat{D}$ and $\hat{G}$ are approximated with a sufficient accuracy defined by one or two predetermined threshold values.

4. The dual harmonization method for a head-worn display system for causing the display of piloting information of an aircraft to conform with the outside real world according to claim 2, in which:

the series of integer number N is equal to three, and the centred sighting visual pattern is set fixed on the display by the dual harmonization computer at three different positions P1, P2, P3 corresponding respectively to three sightings V1, V2, V3:

a first position P1 in a left part of the display and vertically to a centre, and a second position P2 in a right part of the display and vertically to the centre, and a third position P3 horizontally to the centre and upwards.

5. The dual harmonization method for a head-worn display system for causing the display of piloting information of an aircraft to conform with the outside real world according to claim 1, in which:

the series of integer number N is greater than or equal to four and the left matrix $\hat{G}$ of relative orientation between the reference frame linked to the platform of the aircraft and the reference frame linked to the attitude inertial device is unknown, and not seeking to determine the vector $\vec{y}_0$, the solving of system of equations: $\hat{G} \cdot \hat{K}_i \cdot \hat{D} \cdot \vec{x}_i = \vec{y}_0$, i varying from 1 to N, amounts to the solving of the system of equations: $\hat{K}_i \cdot \hat{D} \cdot \vec{x}_i = \vec{z}_0$ for i varying from 1 to 4, by denoting $\vec{z}_0 = \hat{G}^T \cdot \vec{y}_0$, which solving uses an iterative process and a rectifying operator $\pi(\cdot)$ which transforms any matrix A into a 3×3 square matrix of rotation $\pi(A)$ that is as close as possible to a least squares direction over all of the terms of the matrix $\pi(A)-A$ over all of the 3×3 rotation matrices, to determine the matrix $\hat{D}$.

6. The dual harmonization method for a head-worn display system for causing the display of piloting information of an aircraft to conform with the outside real world according to claim 5, in which:

the step of solving of the system of equations comprises a second set of substeps comprising:

in a fourth, initialization substep, initializing a first series of right matrices $\{\hat{D}_{[s]}\}$, [s] denoting an integer rank of progress through the series $\{\hat{D}_{[s]}\}$, by setting $\hat{D}_{[0]}$ equal to $I_3$, $I_3$ denoting n the identity matrix; then:

repeating a fifth, iterative substep for passing from the iteration [s] to [s+1] by computing the value $\vec{z}_{[s+1]}$, then the value $\hat{D}_{[s+1]}$ of the first matrix series using the following equations:

$$\vec{z}_{[s+1]} = \frac{\sum_{i \geq 1} (\hat{K}_i \cdot \hat{D}_{[s]} \cdot \vec{x}_i)}{\left\| \sum_{i \geq 1} (\hat{K}_i \cdot \hat{D}_{[s]} \cdot \vec{x}_i) \right\|}$$

$$\hat{D}_{[s+1]} = \pi \left( \sum_{i \geq 1} (\hat{K}_i^T \cdot \vec{z}_{[s+1]} \cdot \vec{x}_i^T) \right)$$

the series $\{\vec{z}_{[s]}\}$ denoting an auxiliary second series of vectors and the series $\{\hat{D}_{[s]}\}$ converging towards D; then:

in a sixth, stopping substep, stopping the iterative process performed through the fifth substep when the limit $\hat{D}$ is approximated with a sufficient accuracy defined by a predetermined threshold value.

7. The dual harmonization method for a head-worn display system for causing the display of piloting information of an aircraft to conform with the outside real world according to claim 5, in which:

the series of integer number N is equal to four, and the centred sighting visual pattern is set fixed on the display by the dual harmonization computer at four different positions P1, P2, P3, P4 corresponding respectively to four sightings V1, V2, V3, V4:

a first position P1 in a left part of the display and vertically to a centre, and a second position P2 in a right part of the display and vertically to the centre, and a third position P3 horizontally to the centre and upwards, a fourth position P4 horizontally to the centre and downwards.

8. The dual harmonization method for a head-up display system for causing the display of piloting information of an aircraft to conform with the outside real world according to claim 1, in which:

the knowledge of the matrix of relative orientation M01 determined is used to realign a symbology by correcting an alignment error between the display and the mobile tracking first element of the posture detection subsystem.

9. The dual harmonization method for a head-up display system for causing the display of piloting information of an aircraft to conform with the outside real world according to claim 1, in which:

the centred sighting visual pattern provided with a central point is a reticle of a symbology.

10. A head-worn display system that causes a for display of piloting information of an aircraft on a display to conform with an outside real world comprising: a transparent head-worn display, a head posture detection subsystem having a mobile tracking first element securely attached to the transparent head-worn display, a fixed second element securely linked to a platform of the aircraft, and a means to measure and determine a relative orientation M12 of the mobile tracking first element relative to a reference frame of the fixed second element linked to the platform of the aircraft, an attitude inertial device to supply a relative attitude M3$t$ of the platform relative to a terrestrial reference frame linked to Earth, securely fixed to the platform of the aircraft, a harmonization subsystem for the head-worn display system that causes for the display of piloting information on the transparent head-worn display to conform with the outside real world, the harmonization subsystem having a dual harmonization computer and a human-system interface to manage and perform dual harmonization method, wherein the harmonization subsystem is configured to: perform a series of an integer number N of different sightings Vi, wherein N is greater than or equal to 3, and i varying from 1 to N, performed through the transparent head-worn display by aligning a centred sighting visual pattern on any same fixed target of the outside real world, each sighting Vi corresponding to a different fixed position Pi of the centre of the sighting visual pattern on the transparent head-worn display and having a sighting vector $\vec{x}_i$ determined as a function of the position Pi, and, for each sighting Vi, acquiring a corresponding measurement $\hat{K}_i$, of a relative angular orientation of the mobile tracking first element relative to a reference direction, that is fixed relative to the platform of the aircraft, then: computing a matrix of relative orientation M01 between the transparent head-worn display in a tilted position and the mobile tracking first element as a right matrix $\hat{D}$, a solution of a system of equations: $\hat{G} \cdot \hat{K}_i \cdot \hat{D} \cdot \vec{x}_i = \vec{y}_0$ for i=1 to N, A vector $\vec{y}_0$ denoting a vector in an inertial reference frame of the platform of the aircraft corresponding to a target point targeted in the outside real world and being unknown; and a left matrix $\hat{G}$ being a matrix M23 of a relative orientation between the reference frame of the fixed second element, linked to the platform of the aircraft and a reference frame of the attitude inertial device, which is potentially incorrect but assumed constant as a function of time, and which, when it is unknown, requires at least four measurements $\hat{K}_i$.

11. The head-worn display system that causes the display of piloting information of an aircraft on a display to conform with the outside real world according to claim 10, in which:
the series of integer number is greater than or equal to three and the left matrix $\hat{G}$ of relative orientation between the reference frame linked to the platform of the aircraft and the reference frame linked to the attitude inertial device is known, and
the solving of the system of equations $\hat{G} \cdot \hat{K}_i \cdot \hat{D} \cdot \vec{x}_i = \vec{y}_0$, i varying from 1 to N, uses an iterative process and a rectifying operator $\pi(\cdot)$ which transforms any matrix A into a 3×3 square matrix of rotation $\pi(A)$ that is as close as possible to a least squares direction over all of the terms of the matrix $\pi(A)$-A over all of the 3×3 rotation matrices to determine the matrix $\hat{D}$ and the vector $\vec{y}_0$.

12. The head-worn display system that causes the display of piloting information of an aircraft on a display to conform with the outside real world according to claim 11, in which:
the step of solving of the system of equations comprises a first set of substeps comprising:
in a first, initialization substep, initializing a first series of right matrices $\{\hat{D}_{[s]}\}$, [s] denoting an integer rank of progress through the series $\{\hat{D}_{[s]}\}$, by setting $\hat{D}_{[0]}$ equal to $I_3$, $I_3$ denoting an identity matrix; then:
repeating a second, iterative substep for passing from the iteration [s] to [s+1] by computing $\vec{y}_{[s+1]}$ then $\hat{D}_{[s+1]}$ using the following equations:

$$\vec{y}_{[s+1]} = \frac{\sum_{i \geq 1}(\hat{G} \cdot \hat{K}_i \cdot \hat{D}_{[s]} \cdot \vec{x}_i)}{\|\sum_{i \geq 1}(\hat{G} \cdot \hat{K}_i \cdot \hat{D}_{[s]} \cdot \vec{x}_i)\|}$$

$$\hat{D}_{[s+1]} = \pi\left(\sum_{i \geq 1}(\hat{K}_i^T \cdot \hat{G}^T \cdot \vec{y}_{[s+1]} \cdot \vec{x}_i^T)\right)$$

the series $\{\vec{y}_{[s]}\}$ denoting a second series of external direction vectors, the series $\{\vec{y}_{[s]}\}$ and $\{\hat{D}_{[s]}\}$ converging respectively towards $\vec{y}_0$ and $\hat{D}$; then:
in a third, stopping substep, stopping the iterative process performed through the second substep when the limits $\hat{D}$ and $\hat{G}$ are approximated with a sufficient accuracy defined by one or two predetermined threshold values.

13. The head-worn display system that causes the display of piloting information of an aircraft on a display to conform with the outside real world according to claim 10, in which:
the series of integer number N is greater than or equal to four and the left matrix $\hat{G}$ of relative orientation between the reference frame linked to the platform of the aircraft and the reference frame linked to the attitude inertial device is unknown, and
not seeking to determine the vector $\vec{y}_0$, the solving of the system of equations: $\hat{G} \cdot \hat{K}_i \cdot \hat{D} \cdot \vec{x}_i = \vec{y}_0$, i varying from 1 to N, amounts to the solving of the system of equations: $\hat{K}_i \cdot \hat{D} \cdot \vec{x}_i = \vec{z}_0$ for i varying from 1 to 4, by denoting $\vec{z}_0 = \hat{G}^T \cdot \vec{y}_0$, which solving uses an iterative process and a rectifying operator $\pi(\cdot)$ which transforms any matrix A into a 3×3 square matrix of rotation $\pi(A)$ that is as close as possible to a least squares direction over all of the terms of the matrix $\pi(A)$-A over all of the 3×3 rotation matrices, to determine the matrix $\hat{D}$.

14. The head-worn display system that causes the display of piloting information of an aircraft on a display to conform with the outside real world according to claim 13, in which:
the step of solving of the system of equations comprises a second set of substeps comprising:
in a fourth, initialization substep, initializing a first series of right matrices $\{\hat{D}_{[s]}\}$, [s] denoting an integer rank of progress through the series $\{\hat{D}_{[s]}\}$, by setting $\hat{D}_{[0]}$ equal to $I_3$, $I_3$ denoting an identity matrix; then:
repeating a fifth, iterative substep for passing from the iteration [s] to [s+1] by computing the value $\vec{z}_{[s+1]}$, then the value $\hat{D}_{[s+1]}$ of the first matrix series using the following equations:

$$\vec{z}_{[s+1]} = \frac{\sum_{i \geq 1}(\hat{K}_i \cdot \hat{D}_{[s]} \cdot \vec{x}_i)}{\|\sum_{i \geq 1}(\hat{K}_i \cdot \hat{D}_{[s]} \cdot \vec{x}_i)\|}$$

-continued
$$\hat{D}_{[s+1]} = \pi\left(\sum_{i\geq 1}\left(\hat{K}_i^T \cdot \vec{z}_{[s+1]} \cdot \vec{x}_i^T\right)\right)$$

the series $\{\vec{z}_{[s]}\}$ denoting an auxiliary second series of vectors and the series $\{\hat{D}_{[s]}\}$ converging towards $\hat{D}$; then:

in a sixth, stopping substep, stopping the iterative process performed through the fifth substep when the limit $\hat{D}$ is approximated with a sufficient accuracy defined by a predetermined threshold value.

\* \* \* \* \*

UNITED STATES PATENT AND TRADEMARK OFFICE
CERTIFICATE OF CORRECTION

PATENT NO. : 10,761,326 B2
APPLICATION NO. : 16/213921
DATED : September 1, 2020
INVENTOR(S) : Bruno Aymeric et al.

It is certified that error appears in the above-identified patent and that said Letters Patent is hereby corrected as shown below:

In the Claims

In Claim 6, Column 16, Line 17, "equal to $I_3$, $I_3$ denoting n the identity matrix; then:" should be -- equal to $I_3$, $I_3$ denoting an identity matrix; then: --.

In Claim 10, Column 17, Line 3, "A head-worn display system that causes a for display" should be -- A head-worn display system that causes a display --.

In Claim 10, Column 17, Line 17, "a harmonization subsystem for the head-worn display system that causes for the display of piloting information" should be -- a harmonization subsystem for the head-worn display system that causes the display of piloting information --.

In Claim 10, Column 17, Line 21, "and a human-system interface to manage and perform dual harmonization method," should be -- and a human-system interface to manage and perform a dual harmonization method, --.

In Claim 10, Column 17, Line 24, "perform a series of an integer number N" should be -- perform a series of integer number N --.

In Claim 11, Column 17, Line 55, "the series of integer number is greater than or equal" should be -- the series of integer number N is greater than or equal --.

Signed and Sealed this
Ninth Day of November, 2021

Drew Hirshfeld
*Performing the Functions and Duties of the
Under Secretary of Commerce for Intellectual Property and
Director of the United States Patent and Trademark Office*